United States Patent [19]

Muller et al.

[11] Patent Number: 5,227,444
[45] Date of Patent: Jul. 13, 1993

[54] RETICULABLE POLYMER FOR APPLICATIONS IN NON-LINEAR OPTICS

[75] Inventors: Sophie Muller, Palaiseau; Pierre Le Barny, Orsay; Dominique Broussoux, Orleans, all of France

[73] Assignee: Thomson-CSF, Puteaux, France

[21] Appl. No.: 780,214

[22] Filed: Oct. 22, 1991

[30] Foreign Application Priority Data

Oct. 22, 1990 [FR] France ............................. 90 13041

[51] Int. Cl.$^5$ ............... C08F 226/02; C08F 220/32; C08G 77/26
[52] U.S. Cl. ........................ 526/311; 526/298; 526/312; 526/273; 526/292.2; 526/265; 528/26; 528/28; 528/31; 528/33; 525/327.3; 525/328.2; 525/328.4; 525/381; 525/382; 525/384; 525/385; 525/476; 525/474; 522/152
[58] Field of Search .............. 526/265, 273, 298, 311, 526/312, 292.2; 528/31, 33, 26, 28; 525/333.3, 333.6

[56] References Cited

U.S. PATENT DOCUMENTS

| | | | |
|---|---|---|---|
| 4,696,990 | 9/1987 | Noonan et al. | 526/304 |
| 4,929,696 | 5/1990 | DeMartino et al. | 526/312 |
| 5,100,985 | 3/1992 | Allen | 526/245 |

FOREIGN PATENT DOCUMENTS

| | | |
|---|---|---|
| 230898 | 8/1987 | European Pat. Off. |
| 244288 | 11/1987 | European Pat. Off. |
| 316662 | 5/1989 | European Pat. Off. |
| 372433 | 6/1990 | European Pat. Off. |
| 2630744 | 11/1989 | France |
| 9000585 | 1/1990 | PCT Int'l Appl. |

*Primary Examiner*—Joseph L. Schofer
*Assistant Examiner*—M. Nagumo
*Attorney, Agent, or Firm*—Oblon, Spivak, McClelland, Maier & Neustadt

[57] ABSTRACT

The invention concerns a reticulable polymer for use in non-linear optics, the polymer being constituted of a skeleton to which side chains are attached; one chain ensures the amorphous nature of the polymer, the skeleton consisting of polyacrylic, polystyrene or polysiloxane, and a second side chain able to generate non-linear optical effects and terminating in a heat or photochemically reticulable group.

6 Claims, 7 Drawing Sheets

FIG_1

FIG. 2

FIG_3

FIG. 7 a. Copolymer alone
b. Copolymer /tétramine
      (16 min at 107°C)
c. Copolymer /tétramine
      (20H00 at 107°C)

FIG. 8

RETICULABLE POLYMER FOR APPLICATIONS IN NON-LINEAR OPTICS

BACKGROUND OF THE INVENTION

1. The Field of the Invention

The present invention concerns polymeric materials for use in non-linear optics. More specifically, it concerns a new type of amorphic polymers which have a group (chromaphore) in their side chains which, in order to give rise to an active material in non-linear optics, must have been oriented in an electrical field at a temperature close to that of glass transition, the performances of these polymers being particularly stable in time. It would appear to be very useful to use such polymers in the manufacture of components for integrated optics such as a frequency doubler operating at wavelengths of between 0.8 and 2 microns, an electro-optical modulator using an electromagnetic wave with a wavelength of between 0.6 and 2 microns.

2. Description of the Prior Art

Organic materials have shown that they provide non-linear optical performance which is at least as satisfactory as that of inorganic materials such as lithium niobate, potassium dihydrogen phosphate or gallium arsenide and, more specifically, polymers which offer major advantages in application, cost and range of structures as a result of molecular engineering, hold out considerable interest. To date, the polymeric materials available for the preparation of films for non-linear optics are as follows:

Solid solutions of small molecules active in non-linear optics (known as colorant) dissolved in an amorphic polymer or in a liquid crystal polymer.

Copolymers in which the active molecule is bonded to the polymer skeleton in order to avoid problems of solubility and thus increase the level of the entity responsible for non-linear optical effects. In this type of material, the dye attached to the polymer can no longer diffuse within the material but may be the site of relaxation after orientation which contribute to ageing of the performance of the material.

To offset these relaxation-related problems, various research teams have synthesized copolymers presenting a reticulable side chain or a chain carrying an entity which gives rise to non-linear optical effects. (P. Le Barny FR 88 05790) (Joowon Park and Tobin, J. Marks, Jian Yang and George K. Wong, Chem-Maten, 2, 229–231 (1990)). In this case, the main chains of the polymers can no longer move relative to one another as a result of the reticulation, but the side chains carrying colorant molecules retain a sufficient degree of freedom to relax and in time partially lose the orientation initially induced.

Another solution has also been envisaged, that of elaborating active polymers from small multi-function molecules which are active in non-linear optics and can be reticulated by heat treatment (M. Eich et al. (IBM), J. Appl. Phys., 66 (7) (1989)) (D. Jungbauer, B. Reck, R. Tweig, D. Y. Yoon, C. G. Willson and J. D. Swalen, 60 Appl. Phys. Letter, 56 (26) (1990)). The main advantage of such systems lies in the high degree of stability obtained, since the chromophores directly constitute anchor points within the mesh. However, the preparation of the polymer remains vague, and the preparation of oriented films from liquid solutions containing small molecules with very low viscosity still requires the development of a deposition protocol and particularly difficult cooking cycles. Furthermore, the molecules most appropriate for the preparation of polymers of this type do not appear to be those most valuable in non-linear optics.

SUMMARY OF THE INVENTION

This is why the present invention proposes new polymeric materials with side chains in which the entity responsible for non-linear optical effects can also be reticulated by heat or photochemical treatment. Thus, in the reticulated polymer, relaxation of the chains carrying the active groups is constrained, forcing the material to remain in the state of orientation initially imposed. The anchor points are found directly within the chromophores, thus ensuring high stability in time and the preparation of oriented films from polymers of this type does not encounter any specific problems.

More specifically, the polymer consists of a skeleton of a polyacrylic, polystyrene or polysiloxane type to which side chains are attached which are responsible for various functions; a first chain could be heat or photochemically reticulable, thus contributing to the amorphic nature of the material and a second chain may be able to produce non-linear optical effects and also include a terminal reticulable function.

The polymers according to the invention possess the following properties:

- a glass transition temperature of more than 100° C., conferred by the skeleton in the cases derived from polystyrene and the polyacrylics,
- second-order susceptibility performance (characteristic of second-order non-linear optical effects) sufficient (i.e. several pm/V) to make it possible to envisage practical applications,
- stability in time of the performances mentioned above,
- filmogenic polymers of very high optical quality ensuring good transparency at the wavelengths used,
- reticulation which is easy to obtain by heat or photochemical treatment in the same step as the polarization in an electrical field.

The polymers of the polyacrylic type should preferably be obtained by copolymerizing a methacrylic monomer which may carry a heat or photochemically reticulable function, and a monomer carrying an entity active in non-linear optics presenting at one end a polymerizeable methacrylate, acrylate or chloroacrylate function and at the other end, a function which can be reticulated by heat or photochemical treatment.

The polymers of the polystyrene type should preferably be obtained by bonding the active entity onto an existing polyparahydroxystyrene chain.

The polymers of the polysiloxane type are preferably obtained by bonding an active entity onto an existing polysiloxane chain by a hydrosilylation reaction.

The general structure of the polyacrylics, according to the invention, is as follows:

I) The reticulable group R is not part of the entity which gives rise to the non-linear optical effects where x is the molar fraction
X=H.CH$_3$,Cl
Y=—O—C$_n$H$_{2n+1}$ and $1 \leq n \leq 15$, —O—(CH$_2$)$_m$—R
  where $1 \leq m \leq 10$
where R is a chemically reticulable group where R is a photoreticulable group and Z=H, —O—C$_w$H$_{2w+1}$ with $1 \leq w \leq 10$ An entity responsible for second-order optical effects includes an electron donor group, one or two electron acceptor groups and a system with conjugated π electrons; entity A may be as follows:

with $1 \leq q \leq 10$ where D$_1$   —O—, —N—         , —O—(CH$_2$)$_m$—N—
                  |                              |
                  C$_n$H$_{2n+1}$                C$_n$H$_{2n+1}$ and $0 \leq n \leq 3, 2 \leq 3m \leq 15$ or with $1 \leq q \leq 10$ where D$_2$   —O—, —N—         , —O—(CH$_2$)$_m$—N—         ,
                  |                              |
                  C$_n$H$_{2n+1}$                C$_n$H$_{2n+1}$ —O—(CH$_2$)$_m$—O—   and $0 \leq n \leq 3, 2 \leq m \leq 15$ or with $1 \leq q \leq 10$ with D$_3$   —O—, —N—         , —O—(CH$_2$)$_m$—N—         ,
                  |                              |
                  C$_n$H$_{2n+1}$                C$_n$H$_{2n+1}$ -continued and $0 \leq n \leq 3, 2 \leq m \leq 15$

II) The group R is an integral part of entity A:

where
x molar fraction
X=H.CH$_3$,Cl
Y=—O—C$_n$H$_{2n+1}$   and   $1 \leq n \leq 10$,   —NH$_2$,
—O—(CH$_2$)$_q$—NH$_2$ and $2 \leq q \leq 15$  $2 \leq m \leq 15$ The general formula of the polysiloxanes, according to the invention, is as follows:

I) The group R is not part of the entity which gives rise to the non-linear optical effects where Y: is

—C$_n$H$_{2n+1}$                          with $2 \leq n \leq 13$

—(CH$_2$)$_n$—C—O—C$_m$H$_{2m+1}$       with $1 \leq n \leq 13$ and
        ‖                                    $1 \leq m \leq 15$
        O —(CH$_2$)$_n$—C—OR                       with $1 \leq n \leq 13$
        ‖
        O where R is a chemically reticulable group where $1 \leq v \leq 15$ or R is a photoreticulable group with 2 ≦ v ≦ 15 and Z = H, —O—C$_w$H$_{2w+1}$ with 0 ≦ w ≦ 3 with 2 ≦ v ≦ 15

A: is an entity giving rise to second-order optical effects:

where D: —(CH$_2$)$_n$—O—, —(CH$_2$)$_n$—N—
$\qquad\qquad\qquad\qquad\qquad\qquad$ |
$\qquad\qquad\qquad\qquad\qquad\qquad$ C$_m$H$_{2m+1}$ and 1 ≦ n ≦ 10, 0 ≦ m ≦ 13

II) Group R is an integral part of entity A:

with 1 ≦ n ≦ 13 where Y: —C$_m$H$_{2m+1}$, —(CH$_2$)$_m$—NH$_2$ and 1 ≦ m ≦ 13

The general structure of the polystyrenes, according to the invention, is as follows:

I) Group R is not part of the entity which gives rise to non-linear optical effects where: Y is —C$_n$H$_{2n+1}$ with 0 ≦ n ≦ 10, R

R:

with 2 ≦ v ≦ 15 and Z = H, —O—C$_w$H$_{2w+1}$ with 0 ≦ w ≦ 3 with 2 ≦ v ≦ 15

A is an entity giving rise to second-order optical effects:

with 2 ≦ r ≦ 15 where D: —(CH$_2$)$_v$—O—, —C—(CH$_2$)$_v$—N—
$\qquad\qquad\qquad\qquad\qquad$ ||$\qquad\qquad\qquad$ |
$\qquad\qquad\qquad\qquad\qquad$ O$\qquad\qquad\qquad$ C$_w$H$_{2w+1}$ and 1 ≦ v ≦ 15, 0 ≦ w ≦ 3

II) Group R is an integral part of entity A:

with $1 \leq n \leq 15$ where $Y: -C_mH_{2m+1}, -\underset{O}{\overset{\|}{C}}-(CH_2)_q-NH_2$ with $0 \leq m \leq 10$ and $1 \leq q \leq 10$

BRIEF DESCRIPTION OF THE DRAWINGS

The invention will be better understood and other advantages will become clear after reading the description which follows, which is non-restrictive, and from the figure appended, including:

FIG. I, showing the molecular structure of a first example of a polymer according to the invention of a polyacrylic type.

FIG. II, showing a synthesis reaction diagram for the dye monomer of the first example of the polymer according to the invention, of polyacrylic type.

FIG. III, showing the molecular structure of a second example of a polymer according to the invention of a polyacrylic type.

FIG. IV, showing a synthesis reaction diagram for the dye monomer of the second example of the polymer according to the invention, of polyacrylic type.

FIG. V, showing the molecular structure of a third example of a polymer according to the invention of a polyacrylic type.

FIG. VI, showing a synthesis reaction diagram for the dye monomer of the third example of the polymer according to the invention, of polyacrylic type.

FIG. VII, shows an example of a small multi-functional molecule, tri (3-amino trimethylene) amine, used as a reticulation agent by heat treatment in epoxyized copolymers, FIG. VIII, showing the infrared spectra obtained from mixtures: polymer (chemical structure of FIG. I) and reticulation agent (chemical structure of FIG. VII) for variable reticulation times.

DETAILED DESCRIPTION OF THE INVENTION

Preferably, the copolymers according to the invention of the polyacrylic type are obtained by radical polymerization using α, α' azobisisobutyronitrile (AIBN) as a primer and dimethylformamide (DMF) as solvent.

The colorant content is determined by nuclear magnetic resonance and elemental analysis.

Several examples of synthesis of polymers according to the invention, of the polyacrylic type, are given below, together with the performances obtained with polymer materials according to the invention.

EXAMPLE I

This example concerns the synthesis of a polymer of acrylic type. More specifically, this is a copolymer of [methacrylate of methyl, 3-nitro-4-(4'-(N-methyl-N-methacryloxethylamino) benzene-azo) (Carbonyloxy-glycidyl], the structure of which is shown in FIG. I. This synthesis consists of 4 steps, beginning from anilinoethanol according to the reaction diagram shown in FIG. II.

Synthesis of N-methyl anilinoethanol

In a 250 ml container, take 50 g (0.365 mole) of 2 N anilinoethanol, 52.5 g (0.35 mole) of methyl iodide and 66 ml of ethanol. The solution is left overnight under ethanol reflux.

After evaporating the ethanol using a vacuum evaporator, a crystallized yellow residue is obtained. This is dissolved in 200 ml of a 50% solution of potassium hydroxide. The product is extracted with 3×200 ml of ether in a separation flask. The ethereal solution is dried using sodium sulfate, filtered and then evaporated in the vacuum evaporator. A pale yellow oil is obtained. The product is purified by vacuum distillation (boiling point $E_1 = 121°$ C.; reaction yield 75%).

Synthesis of N-methacryloxy-2-ethyl, N-methyl aniline

In a 1 liter container, dissolve in 200 ml of ether: 30 g of N-methyl anilinoethanol (0.2 mole), 3.6 g of 2,6-ditertiobutylphenol and 26.13 g of triethylamine (0.26 mole). To this solution at 5° C., add dropwise a solution of 21 g of methacryloyl chloride (0.2 mole) in 200 ml of ether. The reaction is continued overnight. A second equivalent of triethylamine and methacryloyl chloride is added. The triethylamine hydrochloride is separated by filtration and washed with ether. The filtrate obtained is washed with a dilute solution of hydrochloric acid (pH=4) and then with distilled water until neutral pH. The ethereal phase is dried over magnesium sulfate, filtered and evaporated. A yellow oil is obtained. The product is purified by distilling in the presence of hydroquinone (boiling point $E_2 = 119.5°$ C.; reaction yield 47%).

NB: The hydroquinone which is partially distilled with the product is eliminated by precipitating in hexane and then filtering.

Synthesis of 3-nitro-4(4'(N-methyl-N-methacryloxy-ethyl amino) benzene-azo) benzoic acid 1. Preparation of the Diazonium Salt 12.48 g (0.0685 mole) of 4-amino-3-nitro benzoic acid are dissolved (partially) in 230 ml of a 0.3N solution of sodium hydroxide heated to 60° C. with stirring. A solution of 31 ml of 37% hydrochloric acid is added dropwise through a bromium ampoule. The suspension is then adjusted to 5° C. and a solution of 4.72 g (0.065 mole) of sodium nitrite in 35 ml is added dropwise.

The mixture is stirred for 3 h and the suspension then filtered over sintered glass. The solid residue is rinsed with the minimum quantity possible of water.

2. Synthesis with a Diazoic Derivative

To the solution obtained above is added dropwise a solution of 15 g of N-methacryloyloxy-2-ethyl-N-methyl aniline (0.0685 mole) in 40 ml of ethanol. A dark red precipitate is formed immediately. This is filtered over sintered glass, washed with water and then hexane and dried overnight in a dessicator. Yield in crude product=77%.

Synthesis of 3-nitro-4-(4'-(N-methyl-N-methacryloyloxy-ethyl amino) benzene-azo) carbonyloxy glycidyl 10 g of the crude product obtained above is dissolved in 70 ml of hexamethylphosphortriamide (HMPA) at 60° C. in a 250 ml with a magnetic stirrer. 5.17 g of 1,8-diazobicyclo[5,4,0]-undec-7-ene(DBU), and then 4.66 g of epibromhydrin dissolved in 20 ml of HMPA is added dropwise to the above solution through a bromium ampoule. The temperature is adjusted to about 45° C. and the reaction continued for 3 h.

In order to eliminate the HMPA, the solution is added dropwise to a large volume of water stirred vigorously. A viscous red solid precipitates. It is left to separate overnight. The next morning, the supernatant phase is eliminated and the residue dissolved in chloroform. The organic phase thus obtained is dried over sodium sulfate, filtered and evaporated under vacuum.

The product is then separated by chromatography on a silica column, using toluene as an elutant, recrystallized in a cyclohexane/dichloromethane mixture (80/20) and then dried in a dessicator (mass obtained=3.3 g, i.e. a yield of 50% calculated in terms of the precursor acid present at 60% molar (approximately 60% mass) in the crude product used).

The melting point of the product obtained is equal to 94.6° C. The corresponding copolymer is then obtained by radical polymerization. It is precipitated in ether and dried under vacuum.

A UV spectrum carried out using chloroform as solvent shows an absorption maximum at a wavelength $\lambda=471$ nm.

When $x=0.4$, the copolymer has a glass transition temperature of 117° C.

Synthesis of the Copolymer According to the Invention

An equimolar mixture of methyl methacrylate and of 3-nitro-4-(4'-(N-methyl-N-methyacryloyloxy-ethyl-amino)benzene-azo) carbonyloxy glycidyl polymerized in the presence of AIBN (0.5% molar relative to the monomers) for 24 h at 60° C. yielded a copolymer having a dye content of 50% and a glass transition temperature of 117° C.

EXAMPLE II

This example concerns the synthesis of a polyacrylic-type polymer. This is a copolymer of [methyl methacrylate, 3-nitro-4-(4'N-methyl-N-methacryloyloxyethyl amino) benzene-azo) 1-carbonyloxy-3-cinnamoyloxypropyl], the molecular structure of which is shown in FIG. III. The synthesis of 3-nitro-4-(4'N-methyl-N-methacryloyloxyethyl amino) benzene-azo) 1-carbonyloxy-3-cinnamoyloxypropyl is a convergent synthesis consisting of 6 steps according to the reaction diagram shown in FIG. IV. The first 3 steps, I, II and III, are carried out from 2-anilinoethanol, to 3-nitro-4-(4'-methyl-N-methacryloyloxyethyl amino) benzene-azo) benzoic acid using the same experimental protocol as that described in example I, and 2 steps, IV and V, which lead from cinnamic acid to 3-bromopropanol cinnamate.

Synthesis of the Chloride of Cinnamic Acid

In a 260 ml container equipped for magnetic stirring, take 14.8 g (0.1 mole) of cinnamic acid, 90 ml of oxalyl chloride and then a few drops of DMF. There is a violent release of gas. The reaction is allowed to proceed for 1 hour. The excess oxalyl chloride is then evaporated. A solid crude substance is obtained which is used in the next step without further purification.

Synthesis of 3-bromopropyl cinnamate

In a 500 ml container equipped for magnetic stirring, dissolve 0.1 mole of cinnamoyl chloride in 200 ml of THF. Add 14 g (0.1 mole) of 3-bromopropyl and then dropwise add 11 g (0.109 mole) of triethylamine. Stir at room temperature for 16 hours.

Eliminate the triethylamine hydrochloride by filtering. The filtrate is evaporated to dryness.

The crude product is dissolved in ether. There is an insoluble fraction (acid anhydride) which is eliminated by filtration. The filtrate is evaporated to dryness. Finally, the target ester is purified by vacuum distillation (boiling point: $E_3=135°-138°$ C.).

Synthesis of 3-nitro-4-(4'-N-methyl-N-metacryloyloxyethyl-amino) benzeneazo) 1-carbonyloxy 3-cinnamoyloxypropyl This synthesis, carried out during the sixth step, consists of reacting the products obtained from steps III and V according to an experimental product protocol leading to 3-nitro-4-(4'-(N-methyl) N-methacryloyloxy ethylamino) benzene-azo) carbonyloxy-glycidyl). The crude product is purified by chromatography over silica with toluene as elutant, followed by recrystallization in cyclohexane (melting point M.P.=80° C.).

The corresponding copolymer is then obtained by radical polymerization in dimethylformamide (DMF). It is precipitated in ethanol in inactinic light, washed with ether and then dried under vacuum.

EXAMPLE III

This example concerns the synthesis of a polyacrylic-type polymer, the molecular structure of which is shown is FIG. V: the reaction diagram being shown in FIG. VI.

The synthesis of the colorant monomer is carried out in 6 steps from paraformaldehyde, aniline and 3-bromopropanol.

Synthesis of the Bisulfitic Compound of Methanal

In a container equipped for magnetic stirring, dissolve 60 g of sodium bisulfite ($NaHSO_3$) in 90 ml of water. Add 16 g of paraformaldehyde and heat until a clear solution is obtained. Cool to room temperature and then add 100 ml of ethanol. Leave to crystallize overnight in the freezer. Filter the insoluble and then dry under vacuum. 53.75 g of product is obtained (yield 66.3%).

Synthesis of sodium N-anilino-methylene sulfonate

In a 250 ml container equipped for magnetic stirring, dissolve 49.9 g (0.328 mole) of the bisulfite compound of methanal in 150 ml of water and then add 33 g of aniline (0.355 mole).

Heat to 70° for 30 min. The medium becomes uniform.

The medium is cooled to 4° C. for 16 hours. It sets to form a mass.

The salt is separated by filtration and then washed with ether and dried under vacuum.

45.68 g of compound is obtained (yield 66.6%).

Synthesis of lithium 4-(4(amino)phenylazo)-3-nitrobenzoate

In a container equipped for magnetic stirring, dissolve 11.04 g (0.0528 mole) of sodium anilino-N-methylene sulfonate in 148 ml of a 0.85 molar solution of sodium acetate. The solution is cooled using a mixture of water and ice. To this solution is added dropwise the solution of diazonium salt obtained from 8 g (0.0439 mole) of 3-nitro-4-aminobenzoic acid. A black sludge is obtained. The mixture is allowed to return to room temperature, stirred for 4 hours and then the reaction mixture placed at 4° C. for 16 hours.

The insoluble fraction is separated by filtration. The azoic derivative thus protected is dissolved in 192 ml of a normal solution of LiOH. Heat for 1 h 30 min at 87° C. A precipitate forms.

Allow to return to room temperature.

Separate the solid $F_1$ by filtering (m=5.42 g). The filtrate is acidified by 6N HCl to pH=2.7. A red solid is obtained $F_2$ (m=3.32 g).

$F_1$ is the lithium salt.
$F_2$ is the free acid.

The crude yield in lithium salt is 42.4%.
The crude yield in azoic derivatives is 68.8%.

Synthesis of 3-bromopropyl methacrylate

In a 250 ml container equipped for magnetic stirring, dissolve 11.50 g (0.11 mole) of methacryloyl chloride in 100 ml of benzene. Dropwise, add a solution containing 13.9 g (0.1 mole) of 3-bromopropanol and 11.1 g (0.11 mole) of triethylamine in 50 ml of benzene. Stir at room temperature for 8 hours.

The reaction mixture is then poured into water acidified with HCL. Extract with benzene.

The crude product is purified by distilling under vacuum, $E_5 = 78°-82°$ C. Yield 35%.

Synthesis of 4(2-nitro-4-(methacryloyloxy propyloxy carbonyl)phenylazo)aniline The operating procedure is the same as that for 3-nitro 4(4'-N-methyl-N-methacryloyloxyethylamino)-benzene-azo-)carbonyloxyglycidyl).

MP=126° C. Yield=48%.

The homopolymer derived from 4(2-nitro-4-(methacryloyloxypropylcarbonyl)phenylazo)aniline is obtained by radical polymerization in DMF at 60° C. for 24 hours (inducer AIBN).

Yield 79%, vitreous transition temperature Tg=108.5° C.

The copolymer obtained under the same conditions has a Tg=117° C. for x=0.51.

Preparation of Oriented and Reticulated Films

In the case of the photoreticulable polymers, a film of copolymer about 1 m thick is placed on an appropriately selected substrate (preferable glass coated with ITO) by a method already known (centrifugation).

The film is oriented by subjection to the action of an intense continuous electrical field created by ionization of the air delivered by a metal tip heated at very high voltage 4 kV according to the Corona method, at a temperature of about the Tg of the copolymer. Then, still applying the electrical field, the material is reticulated by irradiating using a UV lamp ($\lambda = 350$ nm).

In the case of polymers reticulable by heat treatment, the procedure is as follows:

To the solution of copolymer prepared for coating the substrate, a small multifunctional molecule is added which can react with the reticulable group carried by the dye, in sufficient quantity that:

$$0.5 \leq \frac{\text{Number of functions carried by the small molecules}}{\text{Number of reticulable functions carried by the copolymer}} \leq 1.5$$

After applying the polymer film to the substrate, the solvent is eliminated under vacuum at room temperature.

The film is then subjected to the polarization field and the temperature raised gradually up to a temperature close to the Tg of the initial copolymer. The cooking time has previously been determined by an infrared spectrometric study of the disappearance of the reticulable functions in function of the cooking time.

Figure 1:
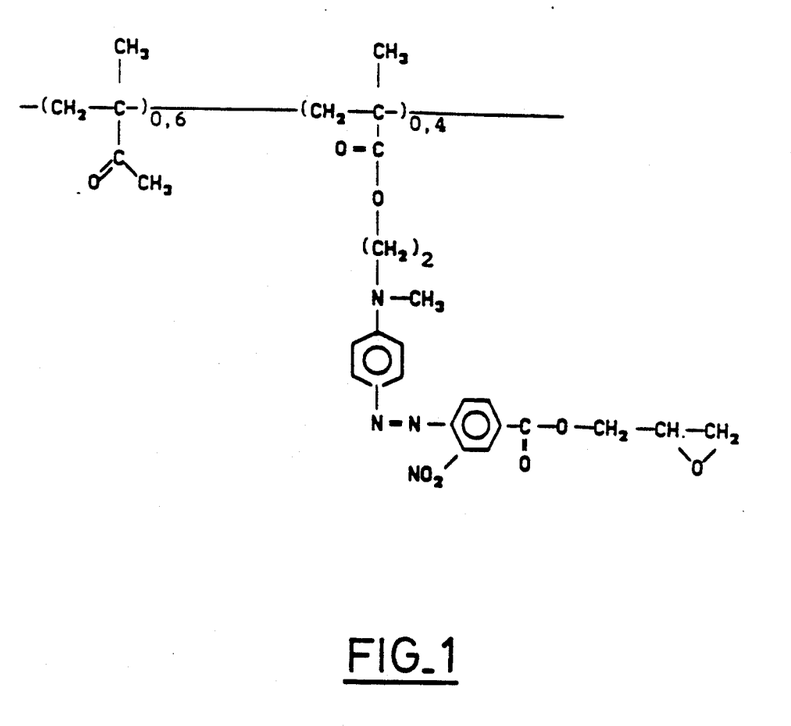
Figure 2:
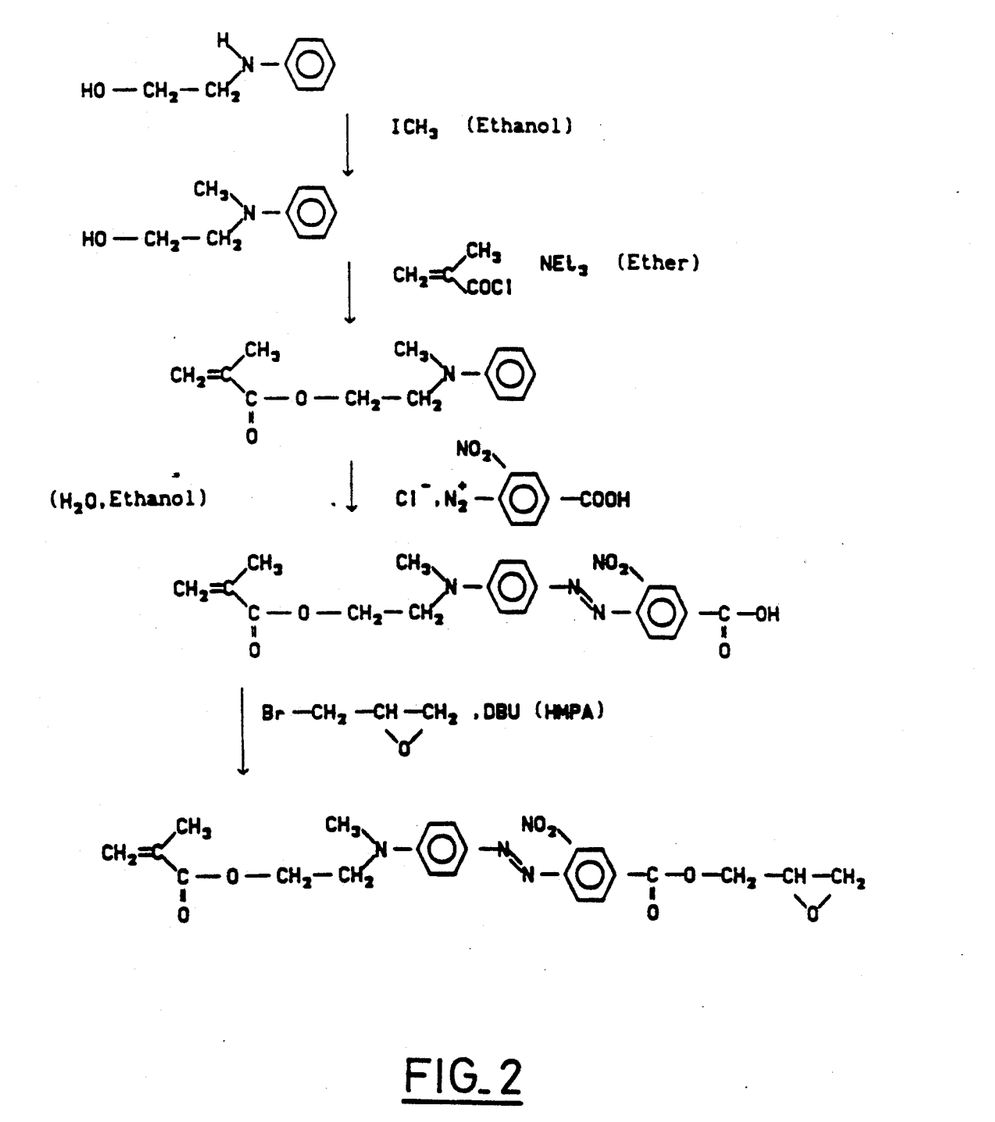
Figure 3:
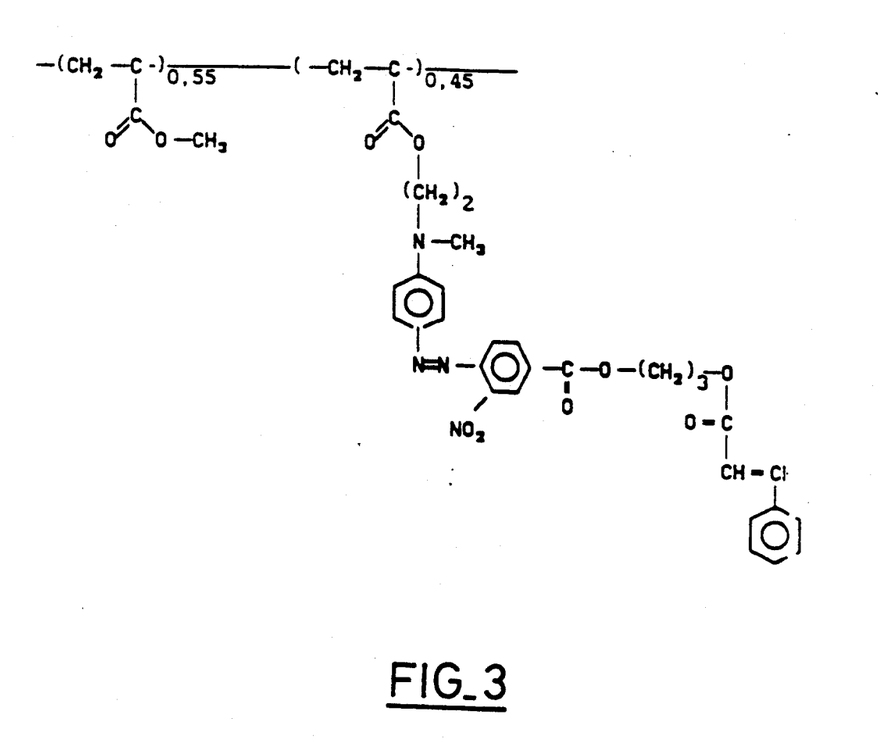
Figure 4:
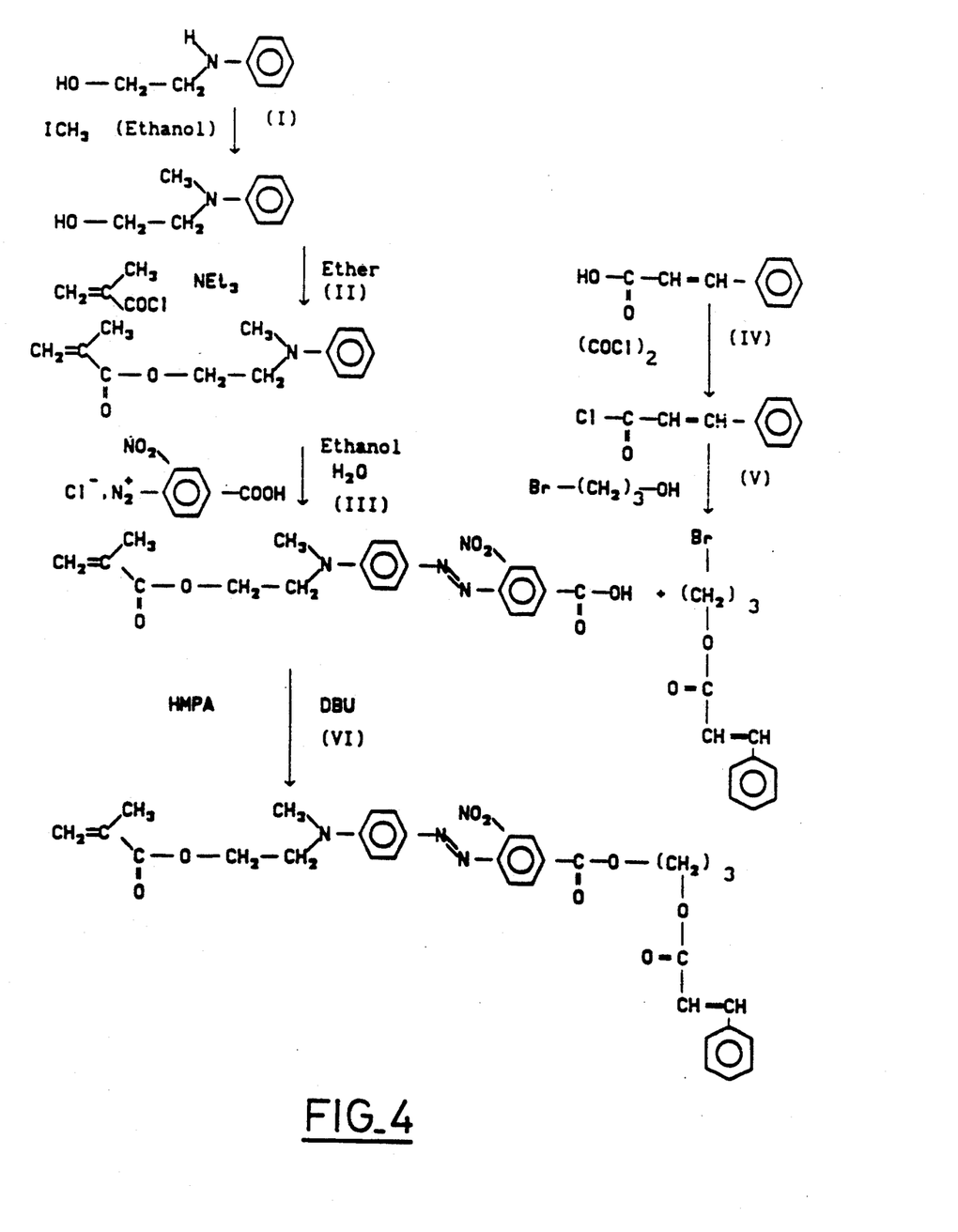
Figure 5:
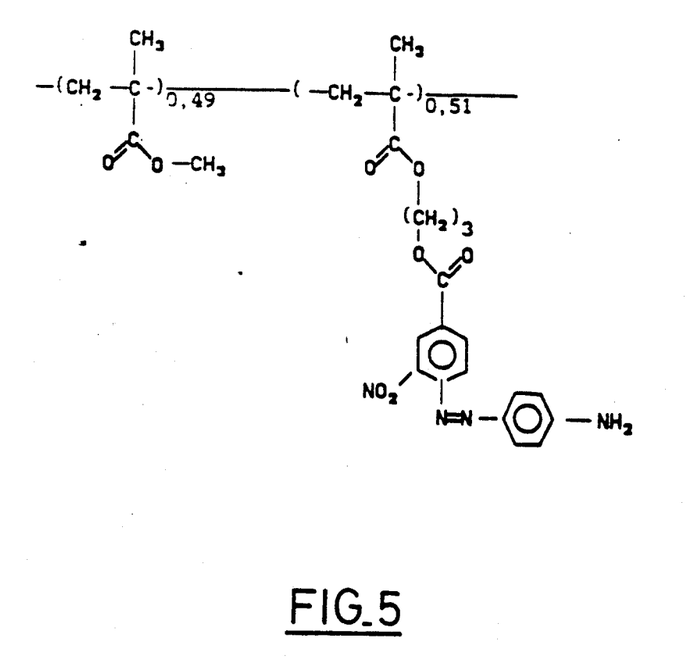
Figure 6:
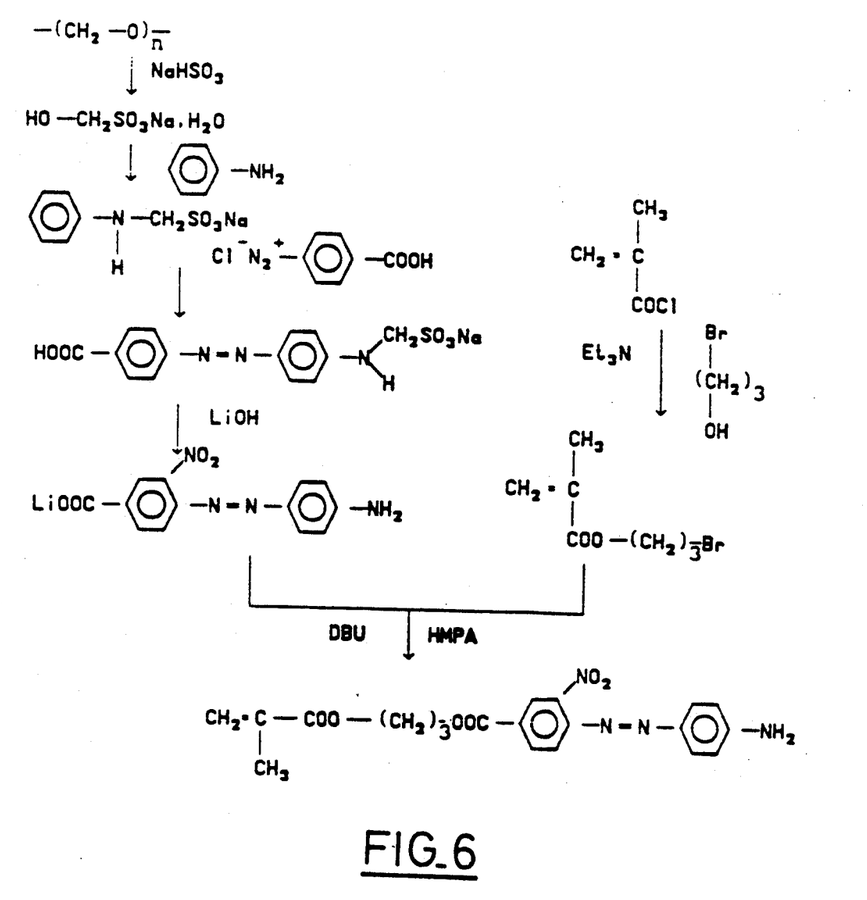

In the case of the copolymers carrying an epoxide function on the chromaphore, the multi-functional molecules may be selected from amongst the polyamines:

the polyols:

In the case of the polymers terminating in an amine function, the multi-functional molecules will be epoxides:

By way of example, we describe the reticulation of the copolymer, the chemical structure of which is shown in FIG. 1, using a small tetramine molecule, the chemical structure of which is shown in FIG. VII.

We first carried out an infrared reticulation study using a model system consisting of glycidyl polymethacrylate (PGMA) which has the following chemical structure:

(PGMA)

and the tetramine previously mentioned, in stoechiometric quantities (number of amine functions=number of epoxy functions).

In practice, a solution containing 120 g/l of PGMA in tetrahydrofuran (THF) is prepared. Pure tetramine is added to this. The deposition of the solution using the revolving platform is carried out on a plate of CsCl at at rotation speed of 1000 rpm for 30 sec. After rapidly drying with a hair dryer, the CsCl plate is put in the oven at the appropriate temperature and the IR spectra recorded at various times (lengthy in view of the duration of recording of a spectrum: 6 min) taking care to replace the sample in exactly the same position for each measurement. Recordings have been carried out in this way at 80° C. and 110° C. For this study, we made use of the ester bands at 1720 cm$^{-1}$, used as an internal reference in the spectrum, and the δNH deformation band of the primary amines at 1560 cm$^{-1}$. Observation of the change with time of the ratio of absorbencies between 1720$^{-1}$ and 1560$^{-1}$ at these two temperatures was used to determine the time after which the amine functions can no longer react (no change in the ratio of absorbencies) and therefore the maximum time required for reticulation at a given temperature T. It thus appeared that at 110° C., no more than 30 min is required to obtain maximum reticulation, whereas nearly 2 h is required at 80° C.

We were able to check the reticulation of our sample qualitatively by immersing it in THF: the film remained insoluble under these conditions.

On the basis of the information provided by these experiments, notably the approximate time required for reticulation between a polymer carrying epoxy functions and a small polyamine molecule at about 110° C., and the characteristic IR bands which may make it possible to follow the progress of reticulation, we then undertook a study of the reticulation in the case of this copolymer plus the tetramine.

We carried out the same experiment as before, at a temperature of 107° C., beginning with a solution containing 120 g/l of copolymer in THF plus pure tetramine in stoechiometric quantity.

The band at 1560 cm$^{-1}$ was very faint on the spectrum at low conversions into the primary amine and was very rapidly masked on the IR spectrum by absorption bands at 1590 cm$^{-1}$ and 1510 cm$^{-1}$. This made it very difficult to assess the progress of the reaction in this way.

In order to obtain more detailed information, notably concerning the change in the epoxy functions in the copolymer, we attempted to obtain spectra with much better frequency resolution. To do this, we used an IR spectrometer with a Fourier transformation (Nicolet). For this preliminary study, 3 deposits on the revolving platform were carried out on KBr pellets: one deposit of the copolymer alone and two deposits using the stoechiometric copolymer/tetramine mixture. One of the latter was subjected to treatment for 16 min at 110° C. and the other 20 h at 110° C.

Analysis of the spectra obtained made it possible to record the change in two bands related to the epoxy functions: the one at 2900 cm$^{-1}$, relative to the vibrations of the valency of the CH$_2$ group of the epoxy, and the other at 870$^{-1}$, relative to the vibrations of deformations of the epoxy cycle (see the changes in these two bands in function of the reticulation rate on FIG. VIII). In both cases, a clear reduction in these two bands was visible with reticulation. The reduction of the bands was already considerable following 16 min at 107° C., which confirmed the observations made using the PGMA/tetramine system.

From these experiments, it emerges that a cooking time of 30 to 40 minutes at 110° C., a temperature close to the Tg of the original copolymer, is sufficient to obtain optimal reticulation of the system in its non-oriented state.

The reticulation with orientation was then begun. To do this, a solution containing 160 mg/ml of copolymer in THF, containing a stoechiometric quantity of tetramine, was prepared. After filtering this solution over a 0.2 m millipore filter and application to a glass slide on a platform revolving at 3000 rpm, a film 1.2 m in thickness was obtained.

The sample was then subjected at room temperature to a polarization field using the Corona method. On the tip of the Corona used, located 2.5 cm from the surface of the sample, a voltage of 5 kV was applied.

The temperature was then increased progressively up to 120° C. at about 10° C. per minute, and simultaneously the voltage increased from 5 to 15 kV.

The sample was left under these conditions (120° C., 15 kV) for a period of 30 min, the time required for the thermic reticulation of the system.

The temperature was then returned to room temperature whilst maintaining the polarization field.

A dissolution test of the film in THF confirmed that reticulation occurred under the conditions used.

What is claimed is:

1. Reticulable polymer for use in non-linear optics, the polymer consisting of a skeleton to which side chains are attached, one of which confers an amorphous nature on the polymer, the polymer also containing a second side chain able to generate non-linear optical effects and terminating in a reticulable group, wherein the polymer corresponds to the following formula:

where
  x is the mole fraction;
  X is selected from the group consisting of H, CH$_3$, and Cl;
  Y is selected from the group consisting of where $1 \leq n \leq 15$, and where $1 \leq m \leq 10$;
R is reticulable and selected from the group consisting of where
Z is selected from the group consisting of H, and where $1 \leq w \leq 10$;
A generates second-order optical effects and is selected from the group consisting of where $1 \leq q \leq 10$ and where
$D_1$ is selected from the group consisting of $D_2$ is selected from the group consisting of

$D_3$ is selected from the group consisting of and where $0 \leq n \leq 3$ and $2 \leq m \leq 15$.

2. Reticulable polymer for use in non-linear optics, the polymer consisting of a skeleton to which side chains are attached, one of which confers an amorphous nature on the polymer, the polymer also containing a second side chain able to generate non-linear optical effects and terminating in a reticulable group, wherein the polymer corresponds to the following formula:

where
x is the mole fraction;
X is selected from the group consisting of H, $CH_3$, Cl;
Y is selected from the group consisting of where $1 \leq n \leq 10$, and where $2 \leq q \leq 15$; and $2 \leq m \leq 15$.

3. Reticulable polymer for use in non-linear optics, the polymer consisting of a skeleton to which side chains are attached, one of which confers an amorphous nature on the polymer, the polymer also containing a second side chain able to generate non-linear optical effects and terminating in a reticulable group, wherein the polymer corresponds to the following formula:

where
x is the mole fraction;
Y is selected from the group consisting of $-C_nH_{2n+1}$  where $2 \leq n \leq 13$, where $1 \leq n \leq 13$ and $1 \leq m \leq 15$, and $$-(CH_2)_n-\underset{\underset{O}{\|}}{C}-OR \quad \text{where } 1 \leq n \leq 13;$$

R is reticulable and selected from the group consisting of $$-(CH_2)_v-CH\underset{O}{-\!\!-\!\!-}CH_2 \quad \text{where } 1 \leq v \leq 15,$$

$$-(CH_2)_v-O-\underset{\underset{O}{\|}}{C}-CH=CH-\!\!\!\bigcirc\!\!\!-Z$$

with $2 \leq v \leq 15$, and

Z is selected from the group consisting of $$H \text{ and } -O-C_wH_{2w+1},$$

where $0 \leq w \leq 3$;

A generates second-order optical effects and is selected from the group consisting of $$D-\!\!\!\bigcirc\!\!\!-N=N-\!\!\!\bigcirc\!\!\!\underset{NO_2}{-}\underset{\underset{O}{\|}}{C}-O-,$$

$$D-\!\!\!\bigcirc\!\!\!-CH=\underset{CN}{C}-\underset{\underset{O}{\|}}{C}-O-, \text{ and}$$

$$D-\!\!\!\bigcirc\!\!\!\underset{NO_2}{-}\underset{\underset{O}{\|}}{C}-O-,$$

where

D is selected from the group consisting of $$-(CH_2)_n-O- \text{ and } -(CH_2)_n-\underset{\underset{C_mH_{2m+1}}{|}}{N}-$$

4. Reticulable polymer for use in non-linear optics, the polymer consisting of a skeleton to which side chains are attached, one of which confers an amorphous nature on the polymer, the polymer also containing a second side chain able to generate non-linear optical effects and terminating in a reticulable group, wherein the polymer corresponds to the following formula:

$$-(O-\underset{\underset{\underset{Y}{|}}{\underset{CH_2}{|}}}{\underset{CH_2}{|}}\underset{CH_3}{\overset{|}{Si}})_{1-x}-(O-\underset{\underset{\underset{(CH_2)_n}{|}}{\underset{CH_2}{|}}}{\underset{CH_2}{|}}\underset{CH_3}{\overset{|}{Si}})_x-$$

[structure continues with O-C(=O)- attached to benzene ring with NO_2 and N=N-C_6H_4-NH_2]

where
x is the mole fraction;
Y is selected from the group consisting of $$-C_mH_{2m+1} \text{ and } -(CH_2)_m-NH_2,$$

where $1 \leq m \leq 13$; and $1 \leq n \leq 13$.

5. Reticulable polymer for use in non-linear optics, the polymer consisting of a skeleton to which side chains are attached, one of which confers an amorphous nature on the polymer, the polymer also containing a second side chain able to generate non-linear optical effects and terminating in a reticulable group, wherein the polymer corresponds to the following formula:

$$-(CH_2-CH)_{1-x}-(CH_2-CH)_x-$$

[with phenyl-O-Y and phenyl-O-[A]-R substituents]

where
x is the mole fraction;
Y is $-C_nH_{2n+1}$ where $0 \leq n \leq 10$;
R is reticulable and selected from the group consisting of $$-(CH_2)_v-O-\underset{\underset{O}{\|}}{C}-CH=CH-\!\!\!\bigcirc\!\!\!-Z$$

and

$$-(CH_2)_v-O-\underset{\underset{O}{\|}}{C}-\underset{\underset{CN}{|}}{C}=CH-CH=CH-\!\!\!\bigcirc$$

where $2 \leq v \leq 15$ and
Z is selected from the group consisting of

$$-H \text{ and } -O-C_wH_{2w+1}$$

where $0 \leq w \leq 3$;

A generates second order optical effects and is selected from the group consisting of where $2 \leq r \leq 15$ and where
D is selected from the group consisting of and where $1 \leq v \leq 15$ and $0 \leq w \leq 3$.

6. Reticulable polymer for use in non-linear optics, the polymer consisting of a skeleton to which side chains are attached, one of which confers an amorphous nature on the polymer, the polymer also containing a second side chain able to generate non-linear optical effects and terminating in a reticulable group, wherein the polymer corresponds to the following formula:

where
x is the mole fraction;
Y is selected from the group consisting essentially of and where $0 \leq m \leq 10$, $1 \leq q \leq 10$ and $1 \leq n \leq 15$.

* * * * *